(12) United States Patent
Snell et al.

(10) Patent No.: US 9,418,116 B2
(45) Date of Patent: Aug. 16, 2016

(54) CAPTURING EVOLUTION OF A RESOURCE MEMORANDUM ACCORDING TO RESOURCE REQUESTS

(71) Applicant: nCino, Inc., Wilmington, NC (US)

(72) Inventors: Nathan Snell, Wilmington, NC (US); Rick Norris, Whiteville, NC (US); Scott Toler, Wilmington, NC (US); Tim Batchelor, Wilmington, NC (US)

(73) Assignee: NCINO, INC., Wilmington, NC (US)

( * ) Notice: Subject to any disclaimer, the term of this patent is extended or adjusted under 35 U.S.C. 154(b) by 0 days.

(21) Appl. No.: 14/848,119

(22) Filed: Sep. 8, 2015

(65) Prior Publication Data

US 2016/0034834 A1 Feb. 4, 2016

Related U.S. Application Data

(60) Provisional application No. 62/047,474, filed on Sep. 8, 2014.

(51) Int. Cl.
*G06F 17/30* (2006.01)
*G06Q 10/06* (2012.01)

(52) U.S. Cl.
CPC .... *G06F 17/30525* (2013.01); *G06F 17/30657* (2013.01); *G06Q 10/06312* (2013.01); *G06Q 10/0635* (2013.01)

(58) Field of Classification Search
CPC .................. G06F 17/30525; G06F 17/30657; G06F 10/06312; G06F 10/0635
USPC ........................................................ 707/736
See application file for complete search history.

(56) References Cited

U.S. PATENT DOCUMENTS

| | | | | |
|---|---|---|---|---|
| 6,112,190 A | * | 8/2000 | Fletcher | G06Q 40/00 705/35 |
| 6,505,176 B2 | * | 1/2003 | DeFrancesco, Jr. | G06Q 10/10 705/38 |
| 7,979,297 B1 | * | 7/2011 | Shivananda | G06Q 10/06 705/7.27 |
| 8,489,498 B1 | * | 7/2013 | Flaxman | G06Q 40/00 705/35 |
| 8,566,125 B1 | * | 10/2013 | Perry | G06Q 10/103 705/35 |
| 8,572,083 B1 | | 10/2013 | Snell et al. | |
| 8,694,355 B2 | * | 4/2014 | Bui | G06N 5/022 705/7.27 |
| 8,762,376 B2 | | 6/2014 | Snell et al. | |
| 9,082,151 B2 | | 7/2015 | Snell et al. | |
| 9,098,875 B2 | | 8/2015 | Snell et al. | |
| 9,268,819 B1 | | 2/2016 | Snell et al. | |

(Continued)

OTHER PUBLICATIONS

Notice of Allowance mailed on Oct. 30, 2015 for U.S. Appl. No. 14/590,714, filed Jan. 6, 2015, all pages.

(Continued)

*Primary Examiner* — Thanh-Ha Dang
(74) *Attorney, Agent, or Firm* — Kilpatrick Townsend & Stockton LLP

(57) ABSTRACT

The present disclosure teaches capturing a resource memorandum as triggers happen in a workflow. A workflow manager detects the triggers and instructs a chronicle processor to update the resource memorandum. The workflow manager instructs a version generator to capture the updated resource memorandum by storing a resource request identifier, a version identifier, a likeness of the resource memorandum, and/or data from the resource memorandum. The workflow manager also forwards a new version of the resource memorandum to institute agents for further review and/or processing according to the workflow.

20 Claims, 10 Drawing Sheets

(56) References Cited

U.S. PATENT DOCUMENTS

| | | | |
|---|---|---|---|
| 2003/0055668 A1* | 3/2003 | Saran | G06F 9/465 705/301 |
| 2003/0220879 A1* | 11/2003 | Gaughan | G06Q 40/02 705/51 |
| 2004/0030649 A1* | 2/2004 | Nelson | G06Q 40/00 705/44 |
| 2004/0068568 A1* | 4/2004 | Griffin | G06F 3/0481 709/227 |
| 2005/0125338 A1 | 6/2005 | Tidwell et al. | |
| 2005/0282141 A1* | 12/2005 | Falash | G09B 19/00 434/365 |
| 2006/0036870 A1* | 2/2006 | Dasari | G06F 21/6218 713/182 |
| 2006/0059073 A1 | 3/2006 | Walzak | |
| 2006/0206416 A1 | 9/2006 | Farias | |
| 2007/0055596 A1 | 3/2007 | Tankovich et al. | |
| 2007/0162375 A1 | 7/2007 | Delf | |
| 2007/0244805 A1* | 10/2007 | Wiryawan | G06Q 40/00 705/38 |
| 2007/0289956 A1* | 12/2007 | Knysh | G05B 19/41815 219/121.68 |
| 2008/0133402 A1 | 6/2008 | Kurian et al. | |
| 2008/0172669 A1* | 7/2008 | McCullough | G06F 9/5038 718/102 |
| 2008/0209313 A1* | 8/2008 | Gonser | G06F 17/248 715/255 |
| 2008/0263022 A1 | 10/2008 | Kostorizos et al. | |
| 2009/0112649 A1 | 4/2009 | Wernikoff | |
| 2009/0164431 A1 | 6/2009 | Zivkovic et al. | |
| 2009/0248560 A1 | 10/2009 | Recce et al. | |
| 2010/0070950 A1* | 3/2010 | Smith | G06F 9/4443 717/127 |
| 2010/0325584 A1* | 12/2010 | McKenzie | G06Q 50/18 715/835 |
| 2011/0075824 A1 | 3/2011 | Geppert et al. | |
| 2011/0112957 A1 | 5/2011 | Ingram et al. | |
| 2011/0131122 A1 | 6/2011 | Griffin et al. | |
| 2011/0161375 A1* | 6/2011 | Tedder | G06F 17/3089 707/803 |
| 2011/0173093 A1 | 7/2011 | Psota et al. | |
| 2011/0296380 A1* | 12/2011 | Dvinov | G06F 8/71 717/122 |
| 2012/0011056 A1 | 1/2012 | Ward et al. | |
| 2012/0029977 A1* | 2/2012 | Alcorn | G06Q 10/06393 705/7.39 |
| 2012/0191594 A1* | 7/2012 | Welch | G06Q 40/02 705/38 |
| 2012/0215812 A1 | 8/2012 | Gilstrap et al. | |
| 2012/0246060 A1* | 9/2012 | Conyack, Jr. | G06Q 40/02 705/38 |
| 2013/0006844 A1 | 1/2013 | Kremen | |
| 2013/0085925 A1* | 4/2013 | Simpson | G06Q 40/025 705/38 |
| 2013/0179331 A1* | 7/2013 | Bennett | G06Q 40/025 705/38 |
| 2013/0231962 A1* | 9/2013 | Au Li | G06Q 40/025 705/4 |
| 2013/0332337 A1 | 12/2013 | Tran | |
| 2014/0201063 A1* | 7/2014 | Snell | G06F 17/30601 705/38 |
| 2014/0258093 A1 | 9/2014 | Gardiner et al. | |
| 2015/0006515 A1 | 1/2015 | Hopkins | |
| 2015/0248724 A1 | 9/2015 | Snell et al. | |
| 2015/0294069 A1 | 10/2015 | Shah | |
| 2015/0310390 A1* | 10/2015 | Steele | G06Q 10/103 705/301 |

OTHER PUBLICATIONS

U.S. Appl. No. 61/714,647, filed Oct. 16, 2012.
U.S. Appl. No. 61/652,970, filed May 30, 2012.
U.S. Appl. No. 61/652,977, filed May 30, 2012.
U.S. Appl. No. 61/792,011, filed Mar. 15, 2013.
U.S. Appl. No. 62/032,239, filed Aug. 1, 2014.
U.S. Appl. No. 62/047,474, filed Sep. 8, 2014.
U.S. Appl. No. 62/102.196, filed Jan. 12, 2015.
U.S. Appl. No. 62/187,487, filed Jan. 12, 2015.

* cited by examiner

CAPTURING EVOLUTION OF A RESOURCE MEMORANDUM ACCORDING TO RESOURCE REQUESTS

This application claims the benefit of priority to and is a nonprovisional of U.S. Provisional Patent Application No. 62/047,474, filed Sep. 8, 2014, entitled "VERSIONING AUDIT TRAIL SYSTEM FOR FINANCIAL INSTRUMENT REQUEST PROCESSING." Related applications are: U.S. patent application Ser. No. 14/590,714, filed Jan. 6, 2015, entitled "FINANCIAL-SERVICE STRUCTURED CONTENT MANAGER, which is a continuation of U.S. patent application Ser. No. 14/516,363, filed Oct. 16, 2014, entitled "FINANCIAL-SERVICE STRUCTURED CONTENT MANAGER," which claims the benefit of priority to U.S. Provisional Patent Application No. 62/032,239, filed Aug. 1, 2014, entitled "ENTITY INTERCONNECT WEB BASED ON FINANCIAL-INSTITUTION ELEMENTS." The above-identified patent applications are incorporated by reference in their entireties for all purposes.

BACKGROUND

Processing a resource request is typically an iterative, time-extended process in which multiple parties collect information relevant to the resource request in a piece-meal fashion. Multiple parties then repeatedly edit the same resource memorandum, pertaining to the qualification profile of the resource requestor. As such, it is difficult, after the fact, to determine the status of the information in the repeatedly edited resource memorandum at the point in time when a resource request was approved or denied. The problem is multiplied when the resource requester is a business entity or comprised of multiple parties.

SUMMARY

The present disclosure teaches capturing a resource memorandum as triggers happen in a workflow. A workflow manager detects the triggers and instructs a chronicle processor to update the resource memorandum. The workflow manager instructs a version generator to capture the updated resource memorandum by storing a resource request identifier, a version identifier, a likeness of the resource memorandum, and/or data from the resource memorandum. The workflow manager also forwards a new version of the resource memorandum to institute agents for further review and/or processing according to the workflow.

What is disclosed is an embodiment of a system for automatically capturing a resource memorandum during processing of a resource request. In the system a chronicle platform retrieves a first version of the resource memorandum, detects a first event, and generates a first trigger when it detects the first event. A workflow manager in the system detects the first trigger and then: generates a first instruction for creating a second version of the resource memorandum. The second version of the resource memorandum is a result of processing the first version of the resource memorandum in response to the first event. The second version of the resource memorandum is also a result of processing the first version of the resource memorandum as a function of the resource request. The workflow manager generates a second instruction for creating a third version of the resource memorandum, wherein the third version is a function of the second version of the resource memorandum and the resource request. The workflow manager generates a third instruction for capturing the second version of the resource memorandum in response to the first event and as a function of the resource request. The workflow manager generates a fourth instruction for continuing to process the resource request. A chronicle processor in the system generates a second version of the resource memorandum by processing the resource request according to the first instruction. A version generator in the system generates a third version of the resource memorandum by processing the second version of the resource memorandum according to the second instruction. The version generator also captures the second version of the resource memorandum in accordance with the third instruction by storing data associated with the second version of the resource memorandum, a version identifier, and a resource request identifier. Finally, the workflow manager in the system continues to process the resource request according to the fourth instruction.

In another embodiment a method for automatically capturing a resource memorandum during processing of a resource request is disclosed. The steps of the method include retrieving a first version of the resource memorandum, detecting a first event, and generating a first trigger when the first event is detected. The next steps include detecting the first trigger and then: generating a first instruction for creating a second version of the resource memorandum. The second version resource memorandum is a result of processing the first version of the resource memorandum in response to the first event. The second version resource memorandum is also a result of processing the first version of the resource memorandum as a function of the resource request. The next step is generating a second instruction for creating a third version of the resource memorandum, wherein the third version is a function of the second version of the resource memorandum and the resource request. Another step generates a third instruction for capturing the second version of the resource memorandum in response to the first event and as a function of the resource request. And yet another step generates a fourth instruction for continuing to process the resource request. The next step is generating a second version of the resource memorandum by processing the resource request according to the first instruction. A further step includes generating a third version of the resource memorandum by processing the second version of the resource memorandum according to the second instruction. And yet another step is capturing the second version of the resource memorandum in accordance with the third instruction by storing data associated with the second version of the resource memorandum, a version identifier, and a resource request identifier. In a final step the workflow manager continues to process the resource request according to the fourth instruction.

In yet another embodiment this disclosure teaches a computing apparatus for automatically capturing a resource memorandum during processing of a resource request. The computing apparatus uses servers and storage media to retrieve a first version of the resource memorandum, detect a first event, and generate a first trigger when it detects the first event. Then, using the servers and the storage media, the computing apparatus detects the first trigger and then: generates a first instruction for creating a second version of the resource memorandum. The second version is a result of processing the first version of the resource memorandum in response to the first event. The second version is a result of processing the first version of the resource memorandum as a function of the resource request. The computing apparatus uses servers and storage media to generate a second instruction for creating a third version of the resource memorandum, wherein the third version is a function of the second version of the resource memorandum and the resource request. The computing apparatus uses servers and storage media and also generates a third instruction for capturing the second version of the resource memorandum in response to the first event and as a function of the resource request; and generates a fourth instruction for continuing to process the resource request. The computing apparatus also uses the servers and the storage media to generate a second version of the resource memorandum by processing the resource request according to the first instruction. Using the servers and the storage media, the computer apparatus next generates a third version of the resource memorandum by processing the second version of the resource memorandum according to the second instruction. The computing apparatus uses servers and storage media then captures the second version of the resource memorandum in accordance with the third instruction by storing data associated with the second version of the resource memorandum, a version identifier, and a resource request identifier. And finally, the computing apparatus, using the servers and the storage media, continues to process the resource request according to the fourth instruction.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
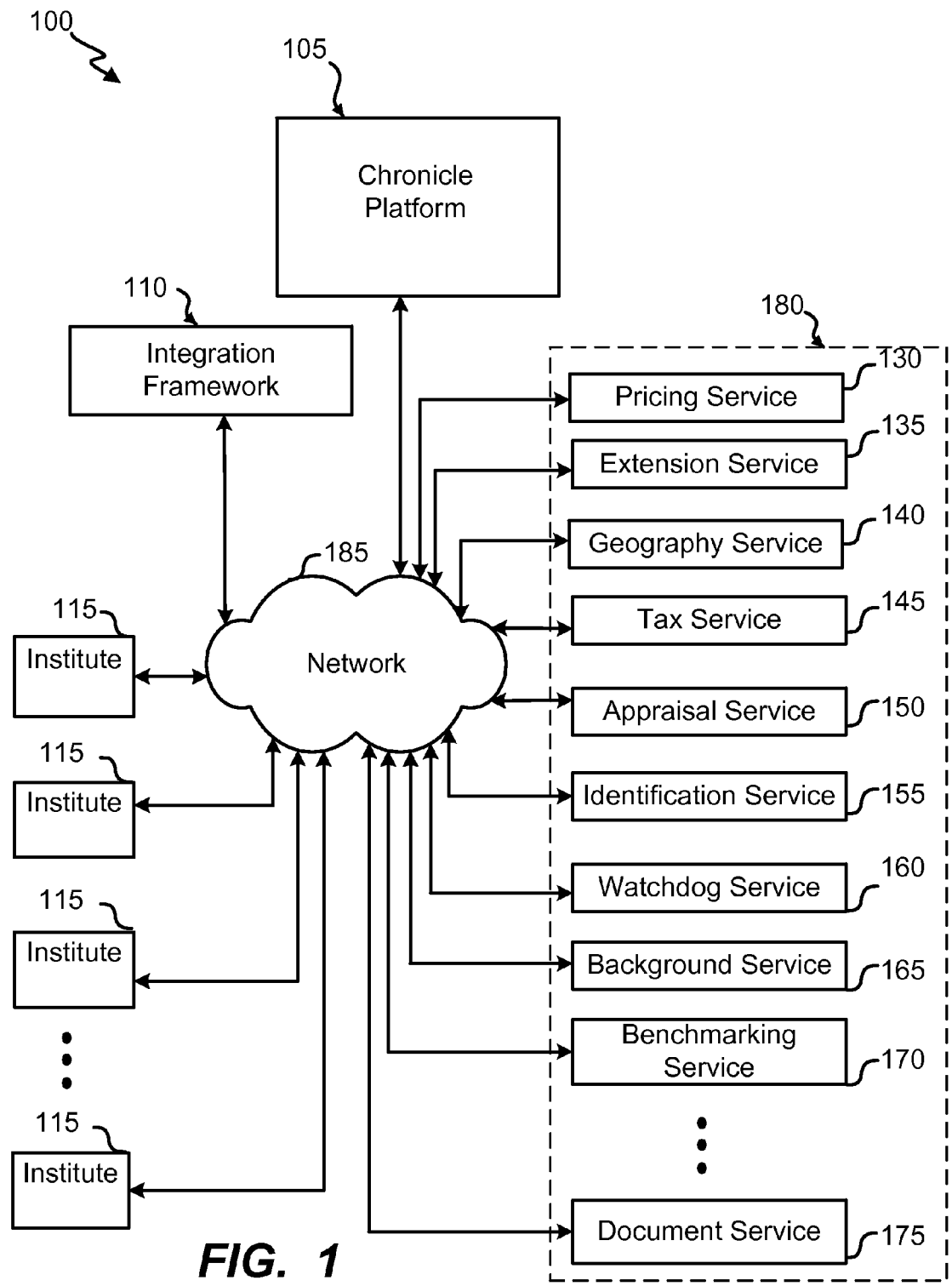
FIG. 1 depicts a block diagram of an embodiment of a chronicle system.

FIG. 1 depicts a block diagram of an embodiment of a chronicle system 100. This embodiment of the chronicle system 100 is built on a multitenant platform such as the Salesforce™ Force.com platform. The multitenant platform is used to provide services from one tenant to multiple unrelated tenants. Each institutes 115 is at least one tenant on the multitenant platform and each tenant uses services on the multitenant platform. A chronicle platform 105 and an integration framework 110 are each tenants on the multitenant platform that provide services to other tenants. An advantage of a multitenant platform is that it is unnecessary for tenants in the multitenant platform to be co-located and, as such, tenants are separated geographically in some cases but share a geographic location in other cases. Another advantage of using a multitenant platform is that each of the institutes 115 tenants on the multitenant platform use the chronicle platform 105 and/or the integration framework 110 over a network 185 such that it is unnecessary for each of the institutes 115 to host their own chronicle platform 105 or integration framework 110. In other embodiments of the chronicle system 100, the institutes 115 host the chronicle system 100 and/or provide portals to the chronicle system 100.

The institutes 115 use the integration framework 110 and the chronicle platform 105 to do, for example, chronicle processing, version generation, backing processing, data aggregation, and report generation. The institutes 115 are entities that fulfill a resource request (e.g., credit unions). The institutes 115 use a resource memorandum in completed form to grant or deny the resource request. The resource memorandum describes, among other things, a qualification profile of a resource requestor. The chronicle platform 105 builds and updates the resource memorandum white it is processing the resource request. For instance, in some cases the chronicle platform 105 generates the resource memorandum that indicates the resource requester is not qualified for the requested resource. In that case the institute 115 can deny the resource request or take alternative action. Initially the chronicle platform 105 assigns each resource request a resource request identifier and the resource memorandum is associated with the resource request by the resource request identifier. The chronicle platform 105 also initially assigns a version identifier to the resource memorandum in order to trace subsequent versions of the resource memorandum that the chronicle system 100 uses while it processes the resource request. While the chronicle platform 105 retains the same resource request identifier while processing the resource request, the resource memorandum will evolve through many versions during the same process and each time the chronicle platform captures the version of the resource memorandum, it will assign a new version identifier to the loan memorandum when it is captured. Accordingly, when the chronicle platform is processing the resource request it creates a traceable history of versions of the resource memorandum that the institutes 115 various agents can audit.

The network 185 connects the institutes 115, the integration framework 110, the chronicle platform 105, and data services 180. The network 185 can include, for example, the Internet, an intranet, a secure network, a virtual private network, a local area network, a wide area network, or a wireless network. The network 185, for example, uses encrypted communications to securely transmit data in some embodiments. The network 185 also connects to the institutes 115, the integration framework 110, the chronicle platform 105, and data services 180 using standard or custom APIs in some embodiments or with any other method or protocol to communicate over a network.

The data services 180 send service data to the institutions 115 and/or the integration framework 110 on the network 185 through to the chronicle platform 105. The chronicle platform 105 uses the service data to, for example, process chronicles, capture resource memorandum versions, aggregate data, and generate reports that the institutes 115 use to grant or deny resource requests. The data services 180 include a pricing service 130, an extension service 135, a geography service 140, a tax service 145, an appraisal service 150, an identification service 155, a watchdog service 160, a background service 165, a benchmarking service 170, and a document service 175. The data services 180 send the service data to integration framework 110. The data services 180 retrieve data from a number of reporting services. For example, the pricing service 130 retrieves data from sources including PrecisionLending™, and the extension service 135 retrieves data from reporting services including CBC Innovis™ and Dunn and Bradstreet™. The geography service 140 retrieves data from reporting services that include FEMA's Flood Map Services Center. The tax service 145 retrieves tax data from reporting services, including, for example, city, county, state, and federal taxing authorities. And the appraisal service 150 retrieves data from reporting services, including, for example, city, county and state appraisal agencies and Kelly Blue Book™. The identification service 155 uses reports from services like Moody's™, Westlaw™, and LexisNexixs™ are included in the reporting services that provide data to the watchdog service 160. One of the sources used by the background service 165 is Equifax Business Connect™. The benchmarking service 170 obtains reports from, for example Reuters™ RNA. The document service 175 uses FIS FLO™ and LaserPro™ providers, among others. The integration framework 110 passes data from data services 180 to the chronicle platform 105 after it has transformed the data.

The integration framework 110 is also a tenant on the multitenant platform. The integration framework 110 receives data and requests in any variety of data formats from one or more sources including the institutes 115, the chronicle platform 105, and the data services 180. In some cases the institutes 115, the data services 180, and the chronicle platform 105 push data and/or requests to the integration framework 110. The integration framework 110 fulfills the request, transforms the data, and sends the data to the correct target. For example: the chronicle platform 105 sends a request for an extension report to the integration framework 110; the integrations framework 110 retrieves the report from the extension service 135; transforms it to a format compatible with the chronicle platform 105, and sends the result to the chronicle platform 105. The integration framework 110 receives data real-time, in batches, or as updated data. The integration framework 110 uses servers and databases to transform the data from a source to a format compatible with the target it is intended for; and sends it to that target. For instance, when the chronicle platform 105 generates an updated resource memoranda for the institutes 115, it sends the updated resource memorandum to the integration framework 110, and then the integration framework 110 transforms the updated resource memorandum to a format expected by institutes 115, and sends it to institutes 115. The integration framework 110 receives and transforms data from other tenants on the multitenant platform concurrently in some cases or sequentially in others. The integration framework 110 is a first interface between both the institutes 115 and the data services 180 and the chronicle platform 105.

The chronicle platform 105 communicates with the institutes 115 and the integration platform 110 using the network 185. The chronicle platform 105 receives content objects from the institutes 115 and the integration framework 105. The chronicle platform 105 creates chronicles and populates the chronicles with the content objects. The chronicle platform 105 processes the populated chronicles to update the resource memorandum and to generate reports and documents that the institutes 115 use to grant or deny the resource request. The chronicle platform 105 captures versions of the resource memorandum and creates a resource request processing history that the institutes 115 agents use for auditing purposes. The chronicle platform 105 generates the presentation and the resource memorandum for the institutions 115 in some cases in a web page format or as an API and in other cases in standard or custom document formats, such as Word™. The chronicle platform 105 also aggregates data from multiple tenants and generates corresponding reports for the institutes 115. The chronicle platform 105 also uses the aggregated data to process chronicles. The chronicle platform 105 serves institutes 115 concurrently in some cases or sequentially in other cases.

Figure 2A:
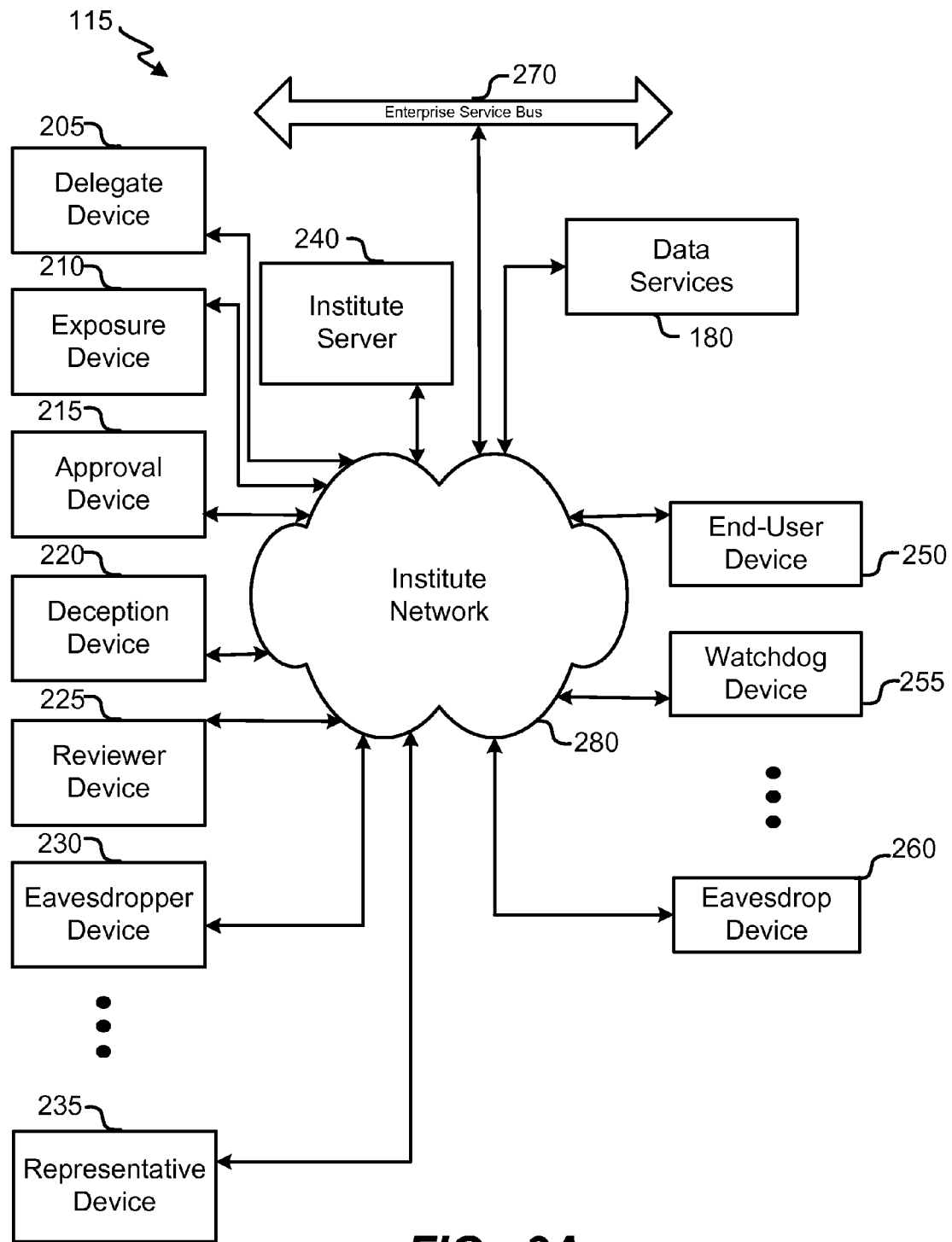
FIGS. 2A and 2B depict block diagrams of institutes.

FIG. 2A depicts a block diagram of an embodiment of the institutes 115. The institutes 115 are entities that grant or deny end-user resource requests such as for home mortgages. The institutes 115 access the chronicle platform 105 to obtain, for example, chronicle processing, resource memorandum updating, version capture, backing processing, data aggregation, and report generation. The institutes 115 internal agents include: a delegate agent using a delegate device 205; an approval agent using approval device 215; a deception agent using a deception device 220; a reviewer agent using a reviewer device 225; an eavesdropper agent using an eavesdropper device 230; a exposure agents using a exposure device 210; and a representative using a representative device 235. The institutes 115 third-party agents include: an end-user using an end-user device 250; a watchdog agent using a watchdog device 255; and an eavesdrop agent using an eavesdrop device 260. Although this block diagram of an embodiment of institutions 115 shows only the single delegate device 205, the single approval device 215, the single deception device 220, the single reviewer device 210, the single representative device 235, the single end-user device 250, the single watchdog device 255, and the single eavesdrop device 260, in other embodiments the institutes 115 include multiple devices in each instance that correspond to multiple agents. The devices comprise all manner of computing apparatus such as general purpose computers, mainframe computers, terminals connected to servers, desktop computers, notebook computers, tablet computers, pad computers, and smart phones. The institutes 115 internal and third-party agents use devices that are connected by an institute network 280 to an institute server 240. The institute server 240 is also connected to an enterprise service bus 270 and the data services 180 by the institute network 280.

The delegate agent is the loan officer in some cases and communicates with the end-user agent that initiated the resource request directly in some cases, for example, in-person or by telephone. The delegate agent requests data and documents from the end-user agent that are necessary to determine whether the end-user is qualified for the resource request. Alternatively the delegate device 205 communicates with the end-user device 250 over the institute network 280 via email, text, facsimile, or any other method of electronic communication. In most cases the chronicle platform 105 will trigger a version capture event when the delegate device 205 collects data from the end-user device 250. The delegate device 205 collects end-user agent data relevant to qualifying the end-user agent for the resource request and sends it to the enterprise service bus 270 or the institute server 240. The delegate device 205 makes requests for and accesses reports and documents that the chronicle platform 105 generates such as the resource memorandum. The delegate device 205 communicates over the institute network 280 with other internal devices including the exposure devices 210, the approval device 215, the deception device 220, the reviewer device 225, the eavesdropper device 230 and the representative device 235 over the institute network 280.

The end-user agent is the resource requester. The end-user agent is an individual requesting a home loan, as an example, or a company representative requesting an equipment loan, as another example. The end-end user agent communicates directly with the delegate agent, for instance in person or by telephone. The end-user agent electronically communicates with institutes 115 using the end-user device 250 and sends content objects related to the resource request to delegate device 205 or the institute server 240. The end-user device 250 accesses reports and documents that the chronicle platform 105 generates over the institute network 280. The end-user agent operates the end-user device 250 outside of the institutes 115 internal network in most cases.

The exposure agent evaluates risk associated with the institutes 115 granting or denying a resource request. The exposure device 210 makes requests for and accesses reports and documents including the resource memorandum that the chronicle platform 105 generates. The exposure device 210 also requests additional data from the end-user device 250 in some cases when the chronicle platform 105 generates a report that indicates the end-user agent is associated with a high exposure that might be mitigated by additional end-user agent data. The exposure device 210 communicates with other internal devices such as the delegate device 205, the approval device 215, and the eavesdropper device 230 over the institute network 280. The approval agent approves the institutes 115 decision to grant or deny the end-user agent's resource request. The approval device 215 makes requests for and accesses reports and documents that the chronicle platform 105 generates, such as updated resource memorandum. The approval device 215 communicates with the reviewer device 225 over the institute network 280. The reviewer agent reviews institutes 115 decisions granting or denying end-user agent requests using the reviewer device 215 to access reports such as the resource memorandum that the chronicle 105 generates. The reviewer device 215 communicates with other internal devices such as the eavesdropper device 230 over the institute network 280.

The eavesdropper agent audits transactions related to resource requests. The eavesdropper device 230 makes requests for and accesses reports and documents including the resource memorandum that the chronicle platform 205 generates. For instance, the eavesdropper device 230 audits the resource memorandum capture history associated with the resource request. The eavesdropper device in some cases communicates with the watchdog device 255 and the eavesdrop device 260 over the institute network 280. The eavesdropper device 230 communicates with all other internal devices over the institute network 280, including the deception device 220. The deception agent monitors transactions related to resource requests for fraudulent activity including an end-user inaccurately reporting revenue. The deception device 220 also makes requests for and accesses reports and documents, including the resource memorandum generated by the chronicle platform 105. The deception device 220 in some cases communicates with the watchdog device 255 and the eavesdrop device 260 over the institute network 280. The deception device 220 communicates with all other internal devices such as the representative device 235 over the institute network 280. The representative agent 235 works in the institutes 115 front offices to conduct in-person end-user transactions. The representative device 235 can access reports and documents including resource memorandum generated by the chronicle platform 105 over the institute network 280.

The watchdog agent monitors transactions related to resource requests for regulatory violations. The watchdog device 255 accesses reports and documents generated by the chronicle platform 105 over the institute network 280. The eavesdrop agent eavesdrops transactions related to resource requests including the resource memorandum capture history. The eavesdrop device 260 accesses reports and documents including the resource memorandum generated by the chronicle platform 105.

The institute network 280 connects the internal devices, the third-party devices, the institute server 240, the data services 180 and the enterprise service bus 270. The institute network 280 can include, for example, the Internet, an intranet, a secure network, a virtual private network, a local area network, a wide area network, or a wireless network. The institute network 280, for example, in some embodiment uses encrypted communications to securely transmit data. The institute network 280 also connects using standard or custom APIs in some embodiments. In most embodiments the institute network 280 will include a firewall to protect the institutes 115 from security access breaches.

The enterprise service bus 270 is a second interface between both the institutes 115 and the data services 180 and the chronicle platform 105. The enterprise service bus 270 receives data in any variety of data formats from one or more sources including the data services 180. In some cases data services 180 push data to the enterprise service bus 270. Conversely, in other cases the enterprise service bus 270 pulls data from the data services 180. The enterprise service bus 270 receives data in real-time, in batches, or as updated data. The enterprise service bus 270 sends data to the chronicle platform in a predefined format acceptable by a data interface 365 and a user interface 320. The enterprise service bus 270 uses servers and databases to transform the data into other formats compatible with the chronicle platform 105. The enterprise service bus 270 sends the transformed date to the chronicle platform 105. The enterprise service bus 270 also transforms the date from the chronicle platform into the proper format for institutes 115. The enterprise service bus 270 also transforms data transmitted and received to and from the data services 180 into compatible formats as required. The enterprise service bus 270 distributes information across the institutes 115 quickly and easily, masks the hardware and networking differences among the devices using institutes 115, and integrates legacy processes and data to current workflows.

The institute server 240 is a computing device connected to all internal and third-party devices, the data services 180, and the enterprise service bus 270 by the institute network 280. The institute server 240 manages, stores, sends, receives, and processes data for the institutes 115. For example, the institute server 240 provides institutes 115 with around-the-clock file and network security, centralized data storage and shared resources, virus management and centralized back up processes. In addition, the institute 240 server controls access to the institute network 280 and other internal process and manages all user credentials. The institute server 240 also provides the authentication interface to mobile and third-party devices using the Internet or other external network from outside of the institute network 280 firewall. Additionally, the institute server 240 provides increased reliability so that there are no interruptions in the institutes 115 workflow processes such as the resource request process The institute server 240 maintains a local database and performs all internal processes for the institutes 115. The institute server 240 also controls all requests to the chronicle platform 105 and access to the integration framework 110 made by all internal and third-party devices through the enterprise service bus 270. For instance, the institute sever 240 directs the enterprise service bus 270 to send updated account data to the chronicle platform each day at a particular time. The institute server 240 also provides file security for the institutes 115 by designating an authorization for each file such that only authorized agents can gain access to that file. For instance, the institute server 240 will not allow an eavesdrop agent access to the institutes 115 employee personal information. The institute server 240 also provides institutes 115 with critical virus protection services to protect the institutes 115 from a virus that a third-party device might introduce. The institute server 240 also provides the authentication interface to mobile devices using the Internet, or any other network, outside of the institute network 280 firewall.

Figure 2B:
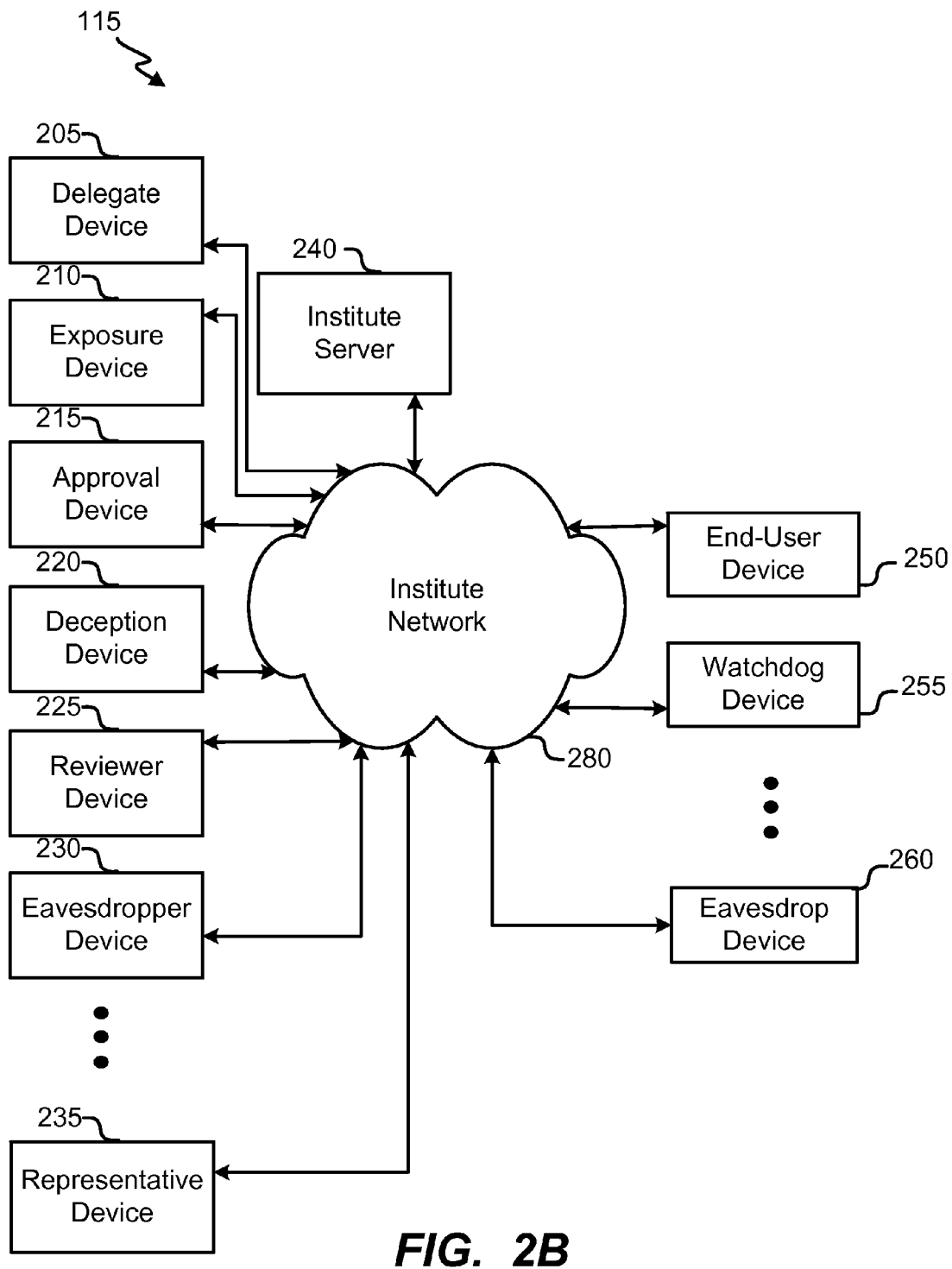

FIG. 2B depicts a block diagram of an embodiment of the institutes 115 without the enterprise service bus 270 and without data services 180 as shown in FIG. 2A. In this embodiment, the integration framework 110 performs the data format transformations for institute 115 as well as interfaces with data services 180 for institutes 115.

Figure 3:
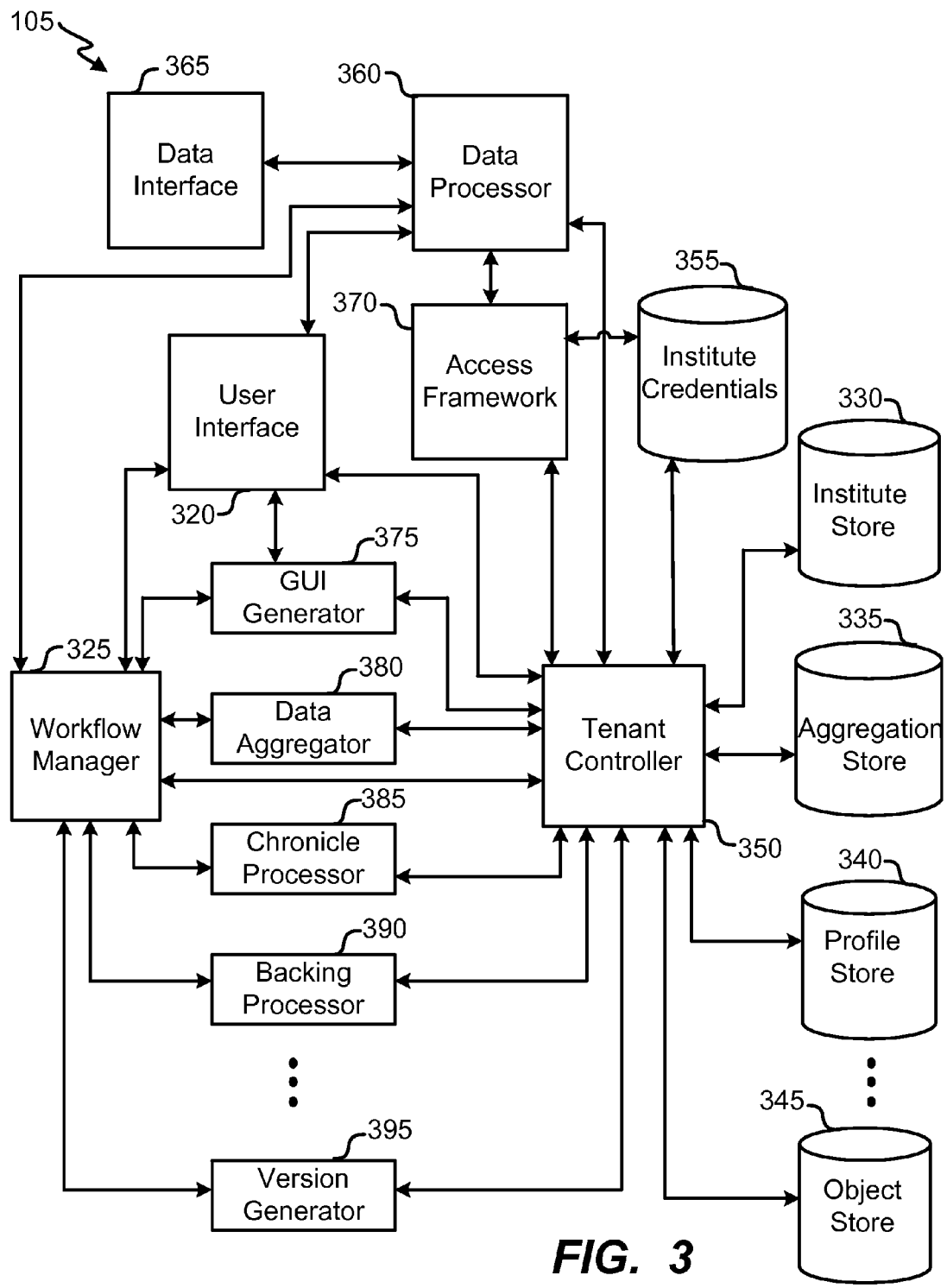
FIG. 3 depicts a block diagram of an embodiment of a chronicle platform.

FIG. 3 depicts the block diagram of an embodiment of the chronicle platform 105. The chronicle platform 105 is a tenant on the multitenant platform that the chronicle system 100 is built on. The chronicle platform 105 is the tenant that provides chronicle system 100 services to other tenants on the platform, specifically the institutes 115 tenants. The chronicle platform 105 communicates directly with the integration framework 110 and the institutes 115 through the data interface 365 and the user interface 320 over the network 185. The data interface 365 communicates using TCP/IP (transmission control protocol/internet protocol) with the integration framework 205 over the network 185. The data interface 365 uses HTTP(s) requests and responses. The data interface 365 transmits and receives data in JSON and XML formats embedded in the HTTP(s) requests and responses. For example, the data interface 365 uses the Salesforce™ Bulk API and makes an HTTP(S) request for large data files from institutes 115 and then receives them with the data embedded in JSON or XML formats in an HTTP(s) response from the integration framework 110. In another example the data interface 365 sends HTTP(s) requests to document service 175 with resource request data embedded in XML format. The data interface 365 also uses HTTP(S) web service calls to request and receive data. For example, the data interface 365 sends HTTP(s) web service requests to retrieve data from pricing service 130, identification service 155, and extension service 135.

The user interface 320 receives and transmits requests and responses between the institute 115 devices and the chronical platform 105 over the network 185 using the enterprise service bus 270 or the integration framework 110. The user interface 320 uses HTTP(s) web service connections in addition to JSON and XML formats embedded in the HTTP(s) requests and responses to communicate and send and receive data between the chronicle platform 105 over the network 185 and to the institute 115 devices by way of the integration platform 110 or the enterprise service bus 270. The user interface 320 transmits presentation data generated by the GUI generator 375 to the institute 115 devices using HTTP(s) web services. While described separately here, both the user interface 320 and the data inter face 365 can be combined as a single interface or can be hosted on a single processor. In other embodiments the user interface 320 and the data interface 365 also use any form of network communication protocols not described here.

A data processor 360 filters the credential and permission information from incoming HTTP(s) requests and responses from data interface 365 and user interface 320 and sends them to an access framework 370 to determine if the requests and responses are from a verified source. The data processor 360 stops processing the HTTP(s) request or response if the access framework 370 does not verify the source. The data processor 360 extracts the embedded data from the response. The data processor 360 then sends the extracted data to a tenant controller 350 and transmits the filtered response to a workflow manager 325. For instance, when the chronicle platform 105 makes an HTTP(s) request for an extension report from the integration framework 110: the integration framework 110 returns an HTTP(s) response with the extension data requested embedded in the HTTP(s) response; the data processor 360 filters the HTTP(s) response and sends the credential and permission information to the access manager 370; the access manager verifies the source; the data processor 360 then extracts the extension data and sends it to the tenant controller 350; and the data processor 360 sends the filtered response to the workflow manager 325. When the workflow manager 325 is ready to send an HTTP(s) request or a response, it transmits instructions to the data processor 360. The data processor 360 interprets the instructions from the workflow manager 325, retrieves data from the tenant controller 350 if so instructed, compiles the HTTP(s) request or response, and transmits the compiled HTTP(S) request or response to the data interface 365. For instance, when the workflow manager 325 determines that a loan memorandum is ready to be transmitted to institutes 115: workflow manager 325 sends instructions to the data processor 360 to retrieve the resource memorandum data from the tenant controller 350 along with general delivery instructions; the data processor 360 retrieves the resource memorandum data from the tenant controller 350 and complies the HTTP(s) response: and the data processor 360 transmits the compiled HTTP(s) response to the data interface 365. At the same time the workflow manager 325 sends instructions to the GUI generator 375 to create a presentation for the institutes 115 devices and instructs the data processor 360 to transmit that presentation to the user interface 320.

The workflow manager 325 manages the processes and interactions in the chronicle platform 105. The workflow manager 325 receives filtered requests and responses from the data processor 360 and parses and interprets them to determine which of the GUI generator 375, the data aggregator 380, the chronicle processor 385, the backing processor 390, and the version generator 395 processes to initiate and control in response to the requests and responses. The workflow manager 325 also receives triggers from the chronicle platform 105 itself that indicate an event has occurred that requires further processing. The workflow manager 325 then initiates the processes, manages the processes to the end, and controls and coordinates interactions among processes. For instance, when the institutes 115 request or a triggering event to capture the current version of the resource memorandum occurs, the workflow manager 325: instructs the tenant controller 350 to retrieve the correct data and send it to a version generator 395; starts the version generator 395; waits for the version generator 395 to generate to capture the version; instructs the version generator 395 to send the result to the tenant controller 350; instructs the tenant controller 350 to retrieve data and send it to the chronical processor 385; starts the chronicle processor 385; waits for the chronical processor 385 to finish; instructs the chronical processor to send the result to the tenant controller 350; instructs the tenant controller 350 to retrieve data and send it to a GUI processor 375; instructs the GUI processor to generate a browser viewable form of the captured resource memorandum; waits for the GUI processor 375 to finish; instructs the GUI processor 375 to send the result to the tenant controller 350; instructs the tenant controller 350 to retrieve data and send it to the data processor 360; and then instructs the data processor 360 to generate an HTTP(s) response that contains a presentation of the event that triggered the version generator 395 to capture the current versions of the resource memorandum. The workflow manager 325 identifies the workflow progression for any process on the chronicle platform 105. The workflow manager 325 initiates each of the GUI generator 375, the data aggregator 380, the chronicle processor 385, the backing processor 390, and the version generator 395 simultaneously or successively or both. For instance, the workflow manager 325 can initiate the version generator 395 to capture a version of the resource memorandum while concurrently initiating the GUI generator 375 to create a presentation to report on the event that triggered capturing the version of the resource memorandum. Conversely, if the workflow to respond to the event that triggered capturing the version of the resource memorandum also required that the chronicle platform 105 return a copy of the version of the resource request, in that case the workflow manager 325 would initiate the version generator 395 and the GUI generator 375 successively.

The access framework 370 controls access to the chronical platform 105. The access framework 370 receives credentials and permissions from incoming HTTP(s) requests and responses; retrieves credentials and permissions from an institute credentials 355; and verifies that the credentials and permissions match or validates them in any number of ways. The access framework 370 also retrieves credentials permissions from the institute credentials 355 and sends them to the tenant controller 350 for the data processor 360 to embed them into the HTTP(s) requests and responses that the data interface 365 sends to the integration framework 110 or the institutes 115.

The tenant controller 350 retrieves and stores data used by all of the processes on the chronicle platform 105. The tenant controller 350 is connected to all storage media and all processors on the chronicle platform. The workflow manager 325 instructs the tenant controller 350 when to retrieve data and where to send it. For instance when the workflow manager 325 is ready to initiate the chronicle processor 385 to complete a workflow, it instructs the tenant controller 350 to retrieve all of the data required to process the workflow and to send it to the chronicle processor 385. The workflow manager 325 instructs the chronicle processor 385 to send the result to the tenant controller 350 when it has completed processing.

The institute credentials 355 stores institutes 115 credentials and permissions. An institute store 330 stores data specific to each of the institutes 115 and its end-users. An aggregator store 335 stores results from a data aggregator 380. A profile store 340 and an object store 345 store data local to the chronicle platform 105. Although depicted as separate storage in FIG. 3, the institute credentials 355, the institute store 330, the aggregator store 335, the profile store 340 and object store 345 are implemented in one or more storage devices in other embodiments.

The GUI generator 375 generates the graphical user interface presentations that the chronicle platform 105 sends through the integration framework 110 or the enterprise service bus 270 to the agent that sent an HTTP(s) request or response to the chronicle platform 105. The workflow manager 325 starts the GUI generator 375 after instructing the tenant controller 350 to retrieve and send data to the GUI generator 375. The institutes 115 may each have any number of graphical user interface format requirements. For instance the GUI generator 375 will generate different graphical user interfaces for a tablet than for a smart phone and yet another for a laptop computer. The workflow manager 325 passes the GUI generator 375 the necessary format instruction in some circumstances and in other circumstances the tenant controller 350 sends the format instruction.

The data aggregator 380 aggregates data from any number of sources that is relevant to processing the resource request. In one example the data aggregator 380 collects data from many tenants on the multitenant platform. The data aggregator 380 then strips all confidential and personal information from the data it receives from the many tenants so that all tenants can access the aggregated data. The data aggregator 380 groups like data and performs any number of statistical analyses on that data. For example, the data aggregator 380 computes the average annual income of every end-user resource requester for all tenants. The data aggregator 380 also aggregates entities and actions related to the resource request. For instance, the data aggregator 380 can aggregate all family members that own a property they are trying to mortgage. The data aggregator 380 can aggregate their annual income, their indebtedness, and other factors critical for the institutes 115 to qualify the resource request. The chronicle processor 390 uses the data aggregator 380 result to process chronicles and update the resource memorandum, in some cases.

The chronicle processor 390 manages interactions and information associated with the resource request. The chronicle processor 390 creates a chronicle for each resource request and populates the chronicle with content objects related to the resource request. The chronicle processor 390 manages all of the documents related to the resource request. The chronicle processor 390 processes the content objects in the chronicle to generate and update the resource memorandum and other reports related to the resource request. For example, the chronicle processor 390 computes the spread of the interest rate used to fulfill a resource request. The chronicle processor 390 uses the content objects from the data services 180 to populate the chronicle with data used to qualify the resource request—for example—a resource request for a home loan, business loan, or vehicle loan. The chronicle processor 390 creates a trigger that the workflow manager 325 detects and processes when predetermined events occur. For instance, when the chronicle processor 390 fills a chronicle with all of the content objects required to establish the qualification profile of the resource requester, the chronicle processor 390 creates the trigger that workflow manager 325 detects and then, once detected, initiates the workflow for capturing a version of the resource memorandum. The workflow manger 325 also initiates the GUI generator 375 to generate a presentation for the institutes 115 agent to signify that the documents required to qualify the resource request are complete, and as such, the resource requester's qualification profile is ready for the institutes 115 agent to evaluate. The chronicle processor 390 is workflow driven by the workflow manager 325 that instructs the chronicle processor 390 how to progress through processing a chronicle based on any number of events occurring externally to the chronicle platform 105 as well as events occurring in the chronicle platform 105.

The resource memorandum is updated numerous times while chronicle system 100 is processing the resource request. For instance it is updated when extension service 135 sends a credit report or when the end-user device 250 uploads a paycheck stub or tax return. The version generator 395 captures versions of the resource memorandum at different points during the resource request processing that the eavesdropper device 230, the watchdog device 255, and the eavesdrop device 260 can audit. In some circumstances, the version generator 395 captures the version of the resource memorandum at the request of the institutes 115. As one example, a delegate device 205 makes a request to the chronicle platform 105 to capture the version of the resource memorandum before sending the resource memorandum to the reviewer device 225 for review. The version generator 395 also automatically captures the version of the resource memorandum based on triggering criteria generated by the workflow internal to the chronicle platform 105, and on such other triggers as the passage of time. For example, the workflow manager 325 detects the trigger sent by the chronicle processor 390 when it received the data from the credit report in the example above and initiates the version generator 395 to capture the version of the resource memorandum. The workflow manager 325 also instructs the version generator 395, to capture the version of the resource memorandum every 90 days. Once the version is captured the version generator 395 also creates a new version of the resource memorandum as dictated by instructions from the workflow manager 325, in some cases, and the new version of the resource memorandum becomes the active resource memorandum used by all parties to continue processing the resource request. According to the workflow instructions generated by the workflow manager 325, the version generator 395 forwards a copy of the captured version of the resource request for further processing, for instance, to the reviewer device 225. And if the instructions from the workflow manager so indicate, the version generator 395 forwards the new version of the resource memorandum to designated devices, such as the delegate device 205. After the version generator 395 captures the version of the resource memorandum it prevents further modification to the captured version in any number of ways. In some cases, the version generator 395 converts an editable document to one that is read-only—for instance the version generator 395 converts a Word document to a PDF document. The version generator 395 can also prevent further modification by write-protect protecting the captured version of the resource memorandum using any number of secure file storage processes and/or protocols either as s PDF file or any other, for instance, JSON or XML data corresponding to fields in the resource memorandum. In the case where the eavesdropper device 230 makes a request to audit the resource memorandum capture history, the chronicle platform 105 retrieves the resource memorandum capture history so that the eavesdropper device 230 can review it.

The backing processor 390 processes collateral related to the resource request. The backing processor 390 calculates for each piece of collateral such values as, for example, percent ownership, percent and length of indebtedness, relative relationship to the resource requester, and annual revenue or losses it generates.

Figure 4:
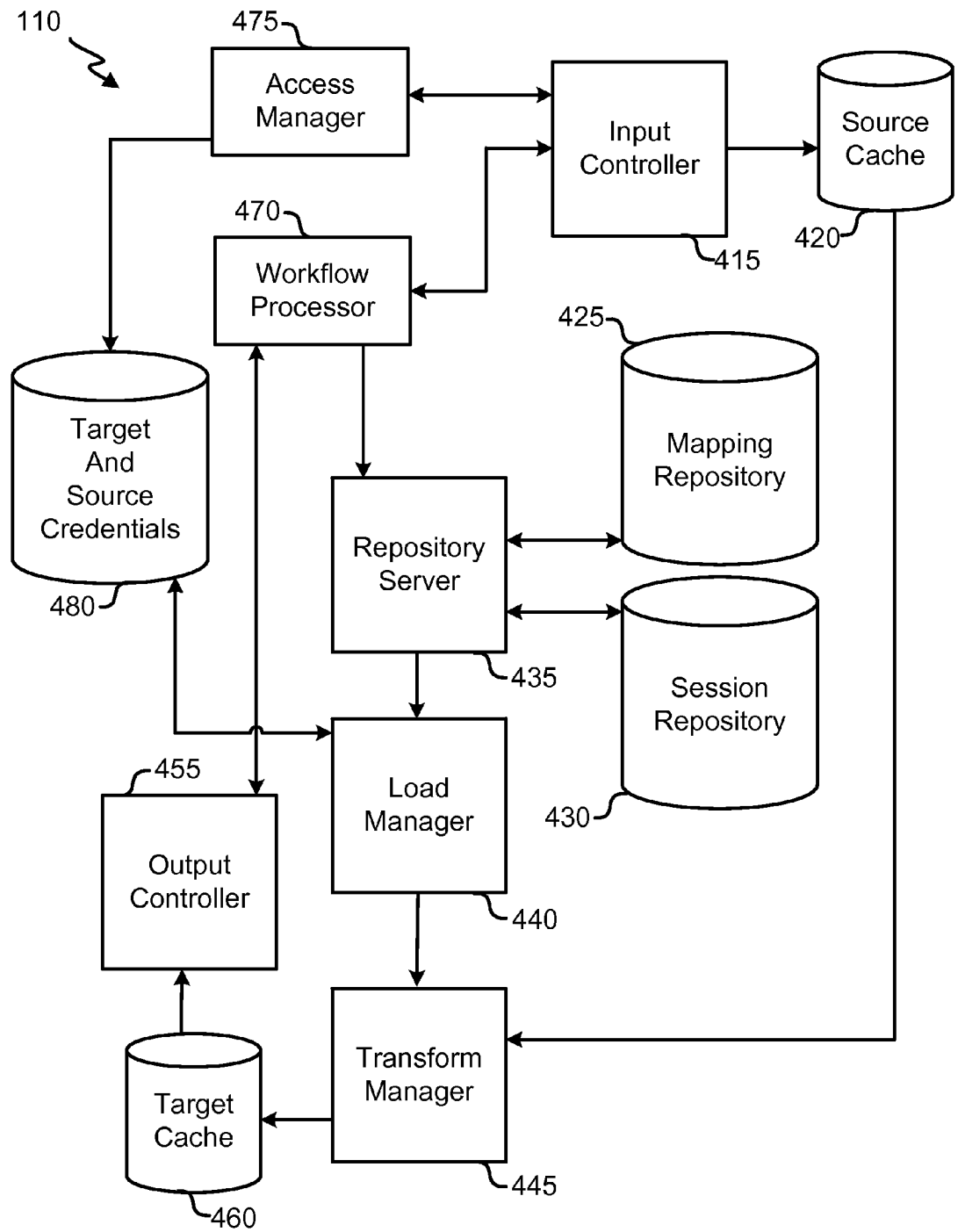
FIG. 4 depicts a block diagram of an embodiment of an integration framework.

FIG. 4 depicts the block diagram of an embodiment of the integration framework 110. The integration framework 110 is also a tenant on the multitenant platform the chronicle system 100 is built on. The integration framework 110 provides services to the chronicle platform 105 tenant and the institutes 115 tenants. The integration framework 110 is the first interface between both the data services 180 and the institutes 115 and the chronicle platform 105. The integration framework 110 therefore receives and sends HTTP(s) requests and responses to the institutes 115, the data services 180, and the chronicle platform 105. The integration platform 110 transforms embedded data in HTTP(s) requests and responses from a source data format of the requester or responder into a target data format for the intended recipient.

An access manager 475 controls input access to the integration platform 110. The access manager uses any known source of access authorization to align credentials of the input data to a target and source credentials 480. For instance, the access manager compares the input data credential to the corresponding credential in the target and source credential 480 and allows processing to continue if they match. In other cases, an encryption code from the target and source credentials 480 is used with the input data encryption key to decrypt the input data.

The input controller 415 receives and filters HTTP(s) requests and responses from the institutes 115, the data services 280, and the chronicle platform 105. The input controller 415 stores the data from the HTTP(s) requests and responses in a source cache 420 and waits until all data to be transformed is received and stored in source cache 420. The input controller 415 then sends the filtered response to a workflow processor 470 once all data is cached and ready to be transformed. For instance, when the extension service 135 sends an HTTP(s) response containing embedded extension data, the input controller 415 filters the HTTP(s) response to strip the embedded extension data, stores the data, checks to makes sure the data is complete, and sends the filtered response to workflow processor 470.

The workflow processor 470 manages all processes and interactions in the integration framework 110. The workflow processor 470 receives filtered requests and responses from the input controller 415. The workflow processor 470 calculates the mapping index and the session index necessary to transform the source data format to the target data format. The workflow processor 470 starts the process of transforming source data formats to target data formats by instructing a repository server 435 to retrieve mapping and session data relating the source data format to the target data format. The repository server 435 retrieves the mapping and session data and passes it to a load manager 440. The mapping maps the source data format to the target data format. The session is a set of instructions that describe how and when to transform the source data format to the target data format.

The load manager 440 validates the source and target by accessing the target and source credential 480 and only continues the process of transforming the data if there is proper validation. The load manager 440 triggers a transform manager 445 to transform the source data format to the target data format using the mapping and the session. For instance, when a source sends data in CVS format and the target requires the data in a text file, the session instructs the transform manager 445 how and when to convert from CVS to text and the transform manager 445 uses the mapping to map CVS fields to text fields. The transform manager 445 sends transformed data to a target cache 460 until all data is transformed. Once the target cache 460 contains all of the transformed data, an output controller 455 embeds the transformed data into an HTTP(s) response or request. In some cases, for example, the output controller 455 embeds the data using JSON or XML. The output controller 455 sends the HTTP(s) response to the target.

Figure 5:
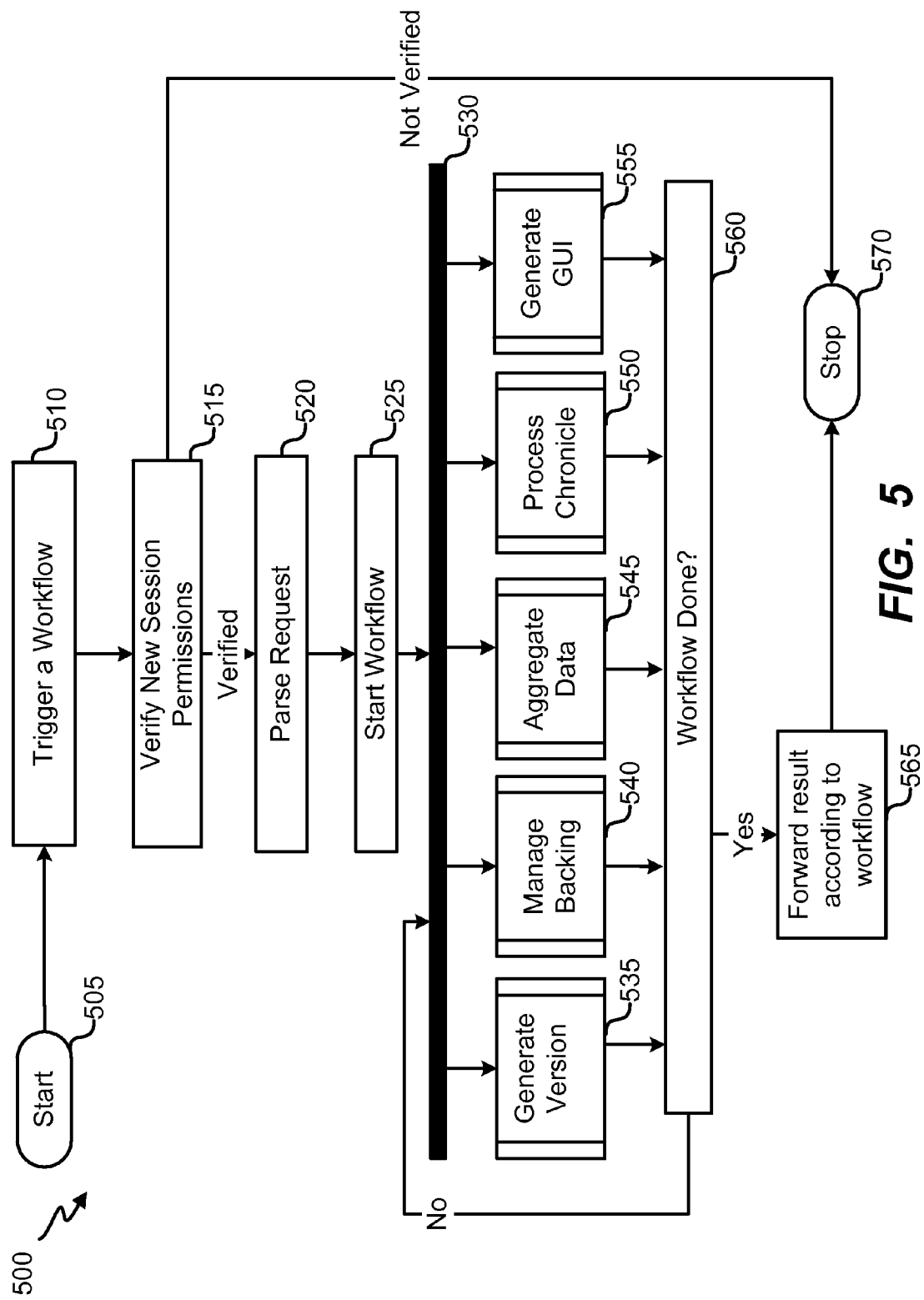
FIG. 5 illustrates a flowchart of an embodiment of a process for processing a resource request.

FIG. 5 illustrates a flowchart of an embodiment of a process 500 for processing the resource request in the chronicle platform 105. The process starts at block 505 when an event triggers a first workflow as shown in block 510. Any number of events occurring internal to the chronicle platform 105 and external to the chronicle platform 105 can trigger the first workflow in any number of ways. Each of the GUI generator 375, the data aggregator 380, the chronicle processor 385, the backing processor 390, and the version generator 395 will, in some cases, trigger a second workflow while in the midst of processing the first workflow. For instance, the chronicle processor 385 can trigger the second workflow when it calculates and/or detects a predetermined condition such as receiving data from data services 180, and the data aggregator 380 can trigger a third workflow when it calculates and/or detects a value that falls into a predetermined range, such as when the aggregate value of an end-user's annual returns are below a specified level. And, for instance, when the institutes 115 make any request related to processing the resource request they trigger a fourth workflow. The access framework 370 must verify credentials and permissions for the first workflow as shown in block 515. The access framework 370 can use any number of methods to verify credentials and permission including comparing credentials to those stored in institute credentials 355. If the access framework 370 cannot verify the credentials and permissions, the first workflow stops as shown in block 570. The data processor 360 filters the external HTTP(s) requests and responses for the first workflow request before the workflow manager 325 parses the request as shown in block 520.

The GUI generator 375, the data aggregator 380, the chronicle processor 385, the backing processor 390, and the version generator 395 are all connected to a synchronization bar 530. The workflow manager 325 synchronizes the GUI generator 375, the data aggregator 380, the chronicle processor 385, the backing processor 390, and the version generator 395 as shown in the synchronization bar 530. The workflow manager 325 calculates which of the GUI generator 375, the data aggregator 380, the chronicle processor 385, the backing processor 390, and the version generator 395 processes can run simultaneously and which must wait for the output of another processes. The workflow manager 325 initiates each process accordingly. As shown in the workflow done block 560, when each process is finished the workflow manager 325 computes whether the GUI generator 375, the data aggregator 380, the chronicle processor 385, the backing processor 390, and the version generator 395 processes are complete or if there are processes that still need to be initiated. The workflow manager 325 continues to check if everything is complete at block 560 until all processes in the first workflow are complete. Any number of iterations of starting a new process can happen in block 560 since any of the GUI generator 375, the data aggregator 380, the chronicle processor 385, the backing processor 390, and the version generator 395 processes can trigger a successive workflow. Once there are no more processes to initiate, the workflow manager 325 computes the destination of where it should route the result of the first workflow and forwards it there as shown in box 565. The workflow stops as shown in block 570. Once the first workflow is triggered as shown in block 510, the process 500 for processing a resource request can start again at block 505 if a second workflow or successive workflow is triggered even if the first workflow has not reached block 570 since the workflow manager 325 controls the synchronization as shown in synchronization bar 530.

Figure 6:
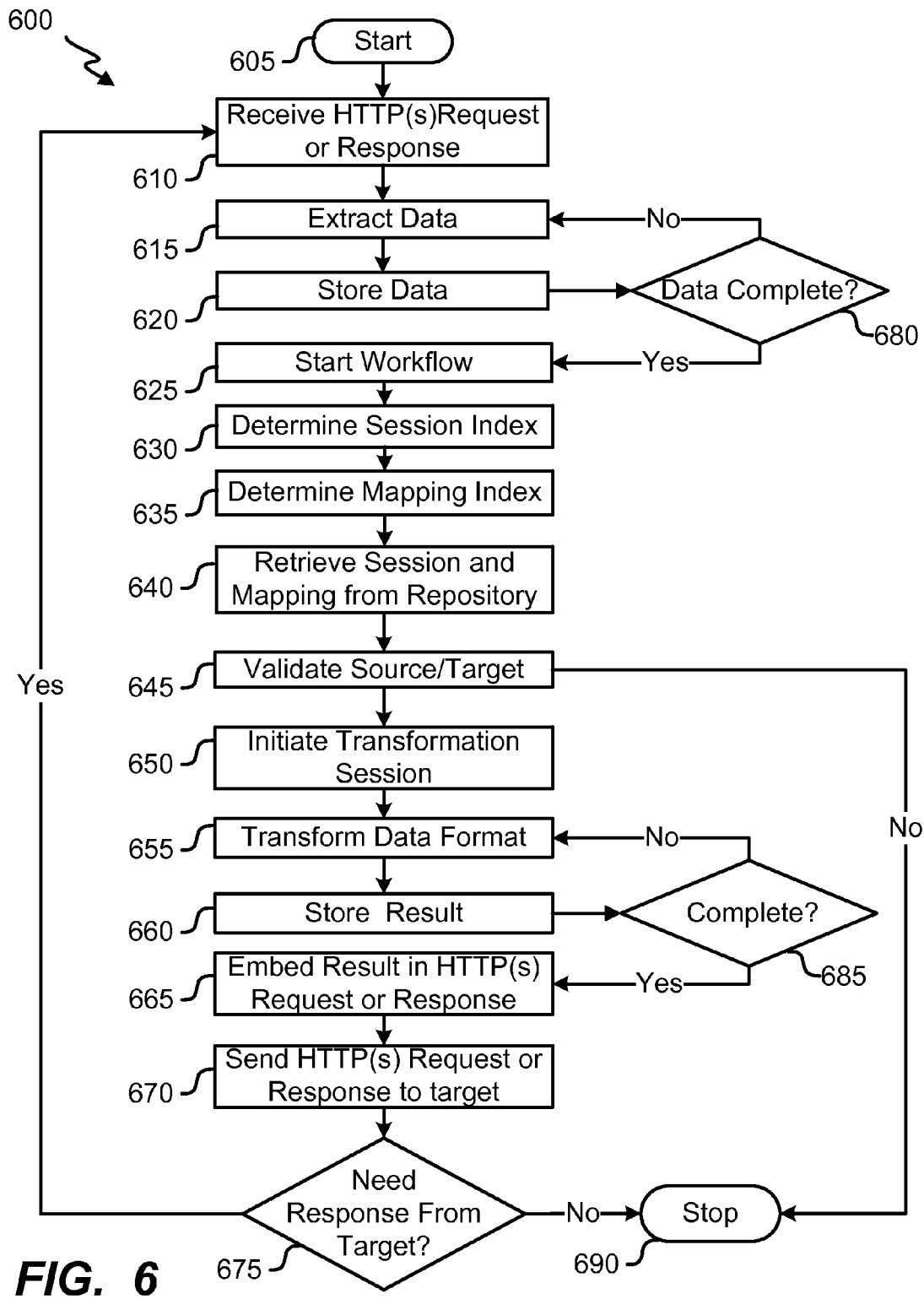
FIG. 6 illustrates a flowchart of the embodiment of a process for transforming source data to target data.

FIG. 6 illustrates a flowchart of the embodiment of a process 600 for transforming the source data format to the target data format. The data interface 365 and the user interface 320 on the chronicle platform 105 receive and transmit date in a first predetermined format. The integration platform 110 executes the process 600 for transforming the source data format to the data format configuration of the data interface 365 and the user interface 320 on the chronicle platform 105 received from the institutes 115 and the data services 180. Conversely, the data services 180 receives and transmits data in a second predetermined format and the institutes 115 transmit and receive data in a third predetermined format. The integration platform 110 also executes the process 600 for transforming the source data format to the target data format for data received by the institutes 115 and the data services 180.

Block 605 shows the start of the process 600 for transforming the source data format to the target format data. The input controller 415 on integration framework 110 receives the HTTP(s) request or response as shown in block 610. The input controller 415 extracts the data from the HTTP(s) as shown in block 615 and stores it in the source cache 420 as shown in block 620. The input controller 415 then checks to make sure that it has received all of the source data as shown in decision block 680. If the input controller 415 has not stored all of the source data it starts the extraction process again as shown in block 615. The input controller 415 will continue to check to make sure it has stored all of the source data in source cache 420 until none is remaining to store, and then the workflow processor 470 starts the workflow as shown in block 625. The workflow processor 470 calculates the session index and the mapping index as shown in blocks 630 and 635 and passes the session index and the mapping index on to the repository server 435. The repository server 435 retrieves the session from the session repository and the mapping from the mapping repository as shown in block 640. The mapping maps the source data format to the target data format. The session is a set of instructions that describe how and when to move the source data format to the target data format.

The load manager 440 validates the target and source credentials as shown in block 645 by matching them to the target and source credentials 480. If the load manager 440 cannot validate the target and source credentials the transformation process stops as shown in block 690. If the load manager 440 validates the target and source credentials it initiates the transformation session as shown in block 650 by triggering the transform manager 445 to start transforming the source data format. The transform manager 445 uses the mapping and the session to transform the source data format for data in the source cache 420 to the target data format as shown in block 655. The transform manager stores the transformed data in the target cache 460 as shown in block 660. The transformation manager then checks to make sure that it has transformed and stored all of the data as shown in decision block 685. If the transform manager 445 has not transformed and stored all of the data from the source cache 420, it continues to transform the source data format as shown in block 655 and stores transformed data in the target cache 460 as shown in block 660. The transform manager 445 iteratively checks to make sure it has transformed all of the data as shown in 685 and stored all of the transformed data in the target cache 460 as shown in blocks 655 and 660. The output controller 455 then embeds the data in the HTTP(s) request or response as shown in block 670 and transmits the data to the target. The workflow processor 470 then determines if the HTTP(s) request or response requires a response as shown in decision block 675 and generates instructions for the input controller 415. One such instance would be when the integration platform 110 sends a request for data from the data services 180. In that case integration platform 110 would need the data from the response from the data services 180 that contains the data it requested. If no response is required, the process 600 for transforming the source data format to the target data format is over as depicted at the block 690. The input controller 415 receives the HTTP(s) response as shown in block 610 if the decision block 675 makes is affirmative and the workflow processor 470 will start the transformation process from block 615 and proceed until it reaches block 690 and stops.

Figure 7:
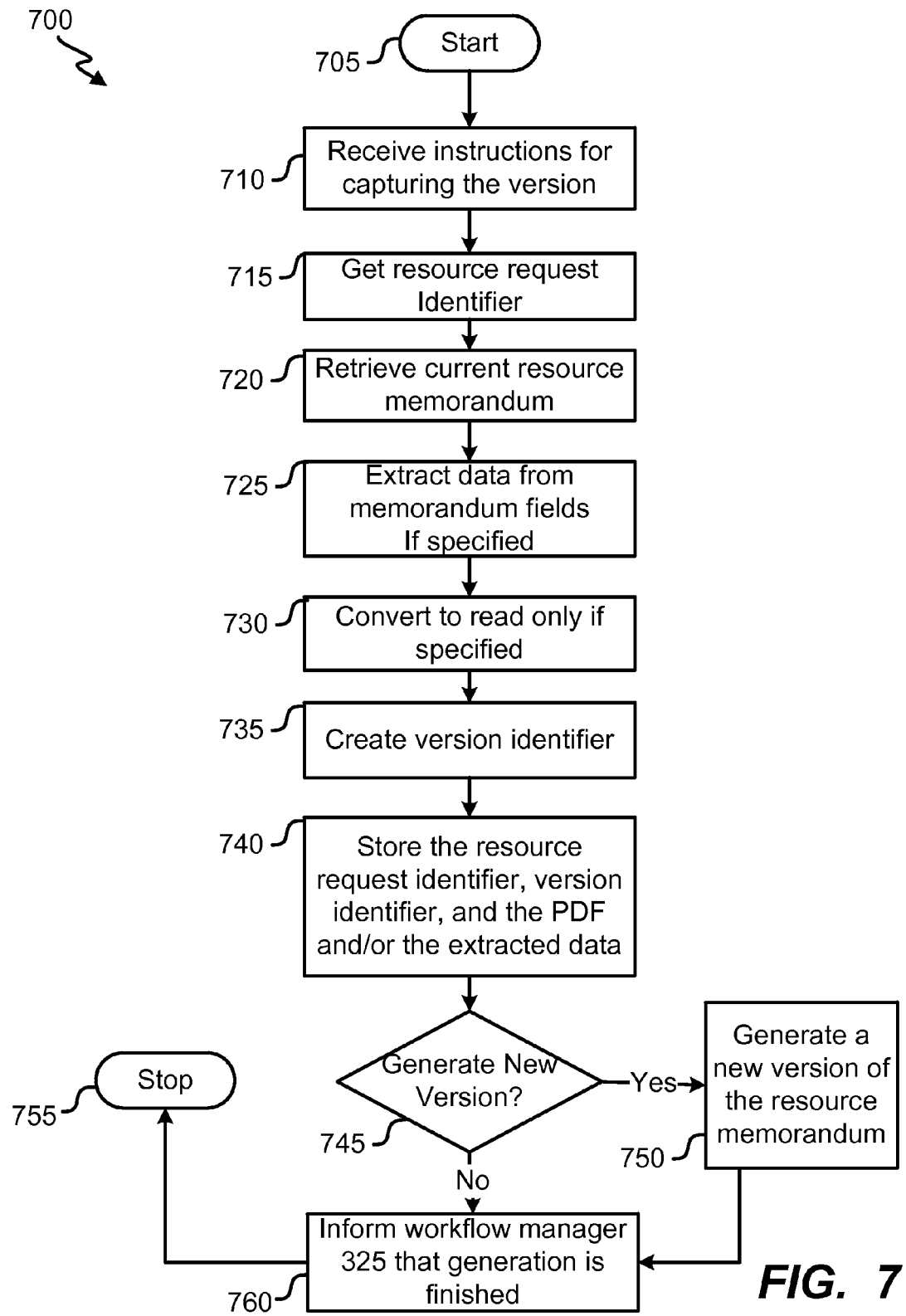
FIG. 7 illustrates a flowchart of the embodiment of a process for capturing the version of the resource memorandum.

FIG. 7 illustrates the flowchart of the embodiment of a process 700 for capturing the version of the resource memorandum. The version generator 395 executes the process 700 for capturing the version of the resource memorandum as part of a larger workflow process controlled by the workflow manager 325. The process 700 starts at block 705 but the process of capturing the version of the resource memorandum is triggered outside of the version generator 395. Once triggered, the workflow manager 325 creates instructions for the chronicle processor 385 to convert a first version of the resource memorandum to a second version of the resource memorandum by updating the first version of the resource memorandum in any number of ways. The workflow manager 325 creates the instruction to capture the version of the resource memorandum and sends it to the version generator 395 as shown in block 710. The version generator 395 gets the resource request identifier as shown in block 715. The version generator 395 then retrieves the second version of the resource memorandum as shown in block 720. The version generator 395 then extracts data from the second version of the resource memorandum fields as shown in block 725, for instance in JSON or XML formats. The version generator 395 also converts the second version of the resource memorandum into a read-only format as shown in block 730, such as PDF. The version generator 395 creates a version identifier as show in block 735 based on the resource request. The version generator 395 executes the process 700 for capturing the version of the resource memorandum any number of times while the chronicle platform 105 is processing the resource request. The version identifier, thus, reflects a new version number each time the version generator 395 executes the process 700. The version generator 395 then captures the second version of the resource memorandum by storing the resource request identifier, the version identifier, and the read-only second version of the resource memorandum and/or the extracted data as shown in block 740. The version generator 395 securely stores the second version of the resource memorandum by storing the resource request identifier, the version identifier, and the read-only second version of the resource memorandum and/or the extracted data in a secure manner such that it not accessible without security credentials, and in some cases, so that it cannot be modified. If the workflow manager 325 instructed the version generator to create a third version of the resource memorandum, decision at decision block 745 is "yes" as shown. The version generator 395 creates the third version of the resource memorandum according to the resource request. The version generator 395 informs the workflow manager 325 that is finished capturing the second version of the resource memorandum as shown in block 760. The process 700 for capturing the version of the resource memorandum is finished as indicated in block 755.

Figure 8:
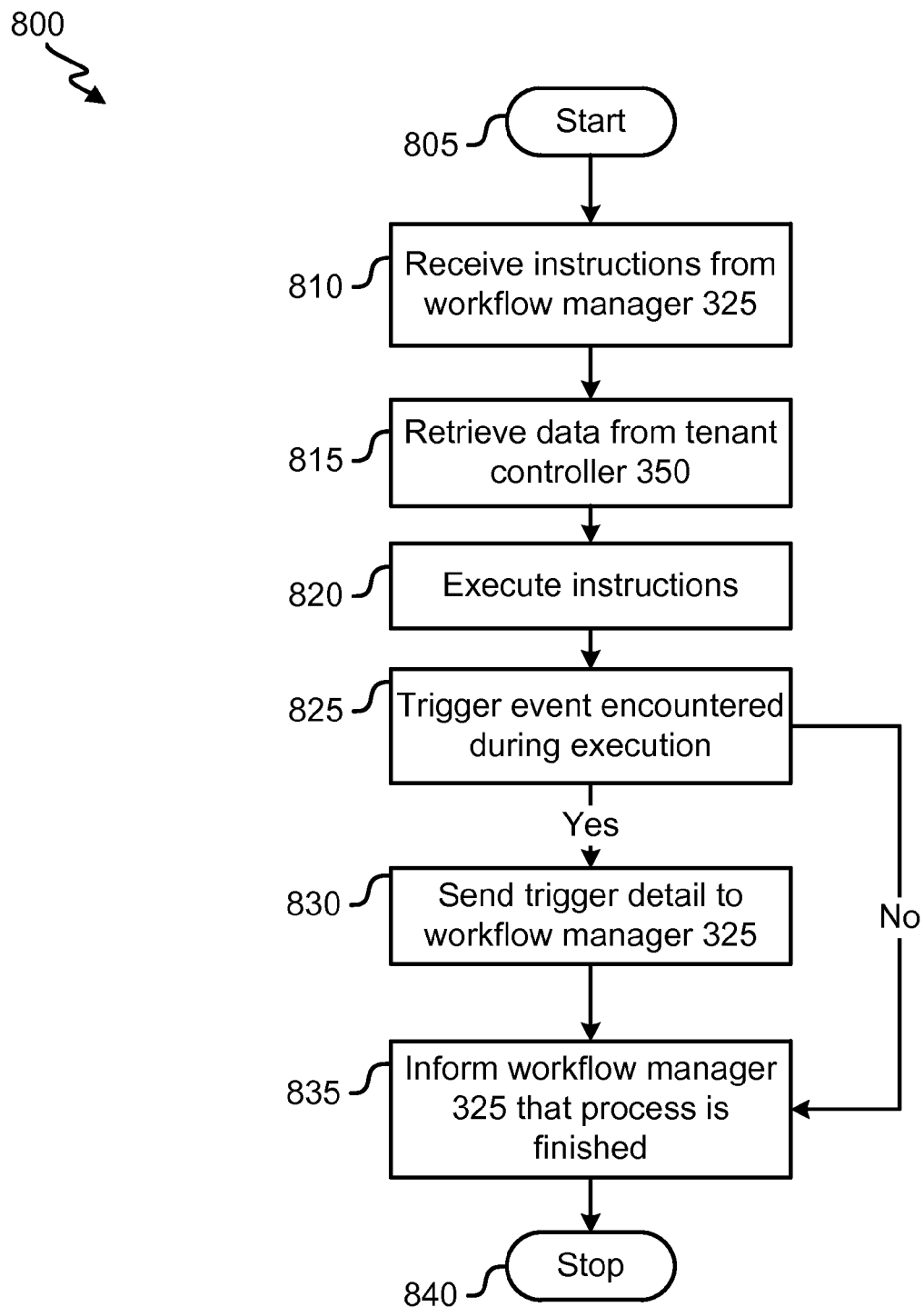
FIG. 8 illustrates a flowchart of the embodiment of a process for processing a resource request.

FIG. 8 illustrates the flowchart of an embodiment of a process 800 for processing a resource request. When the workflow manager 325 detects a trigger to process a resource request, it creates the instructions the chronicle processor 385 needs to process the resource request and sends them to the chronicle processor 385 as shown in block 810. The chronicle processor 385 retrieves the data it needs to process the chronicle, such as a credit report from extension service 135, as shown in block 815. The chronicle processor 385 executes the instructions as shown in block 820. If processing the resource request according to the instructions causes another triggering event as shown in block 825, the chronicle processor 385 sends the trigger detail to the workflow manager 325 as shown in block 830. Once finished processing the resource request, the chronicle processor 385 informs the workflow manager 325 that it has finished as depicted in block 835. The process 800 is finished as shown in block 840.

Figure 9:
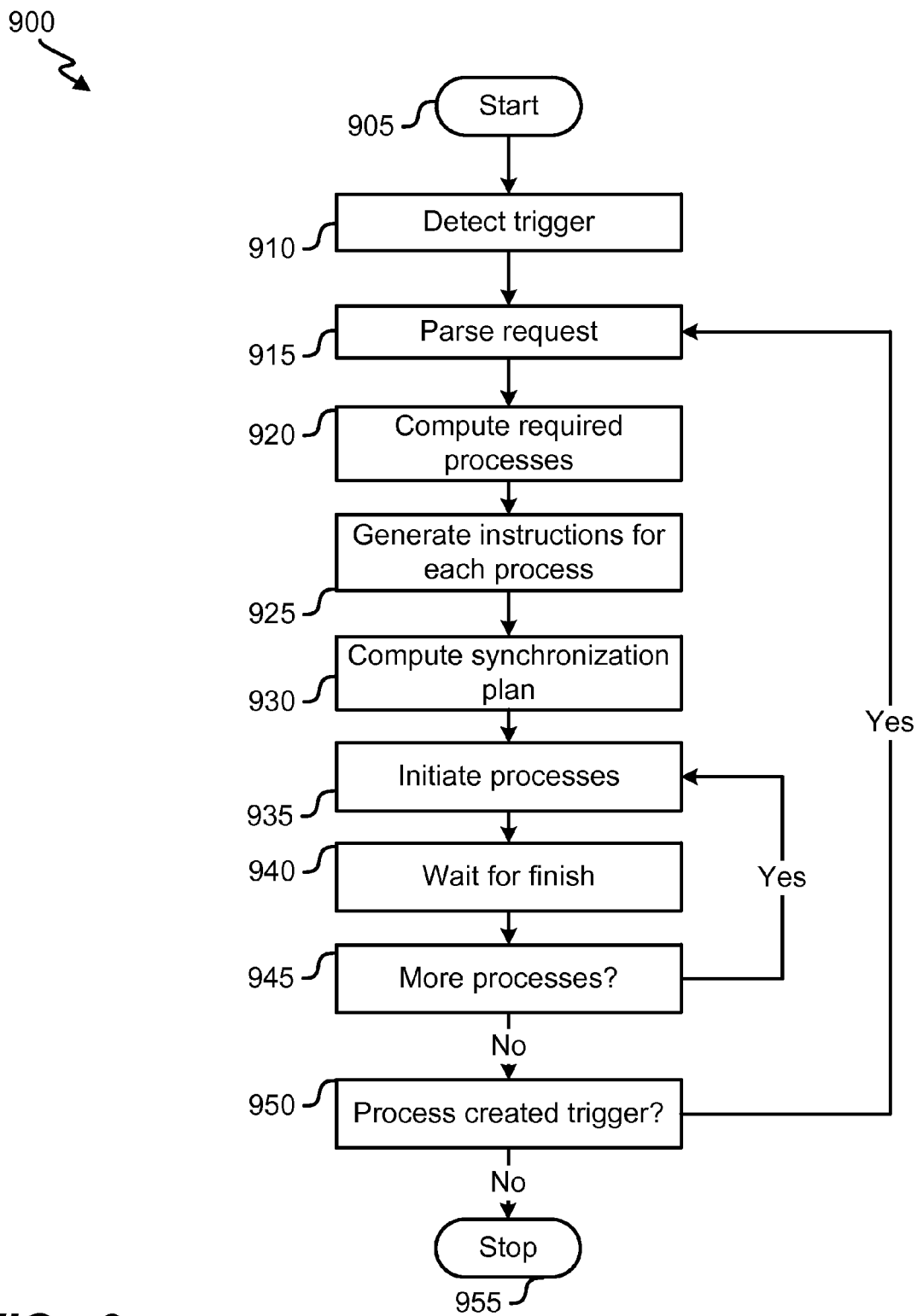
FIG. 9 illustrates the flowchart of the embodiment of a workflow manager processing a workflow.

FIG. 9 illustrates the flowchart of an embodiment of a process 900 for workflow management. When the workflow manager 325 detects a trigger to process a workflow request as shown in block 910, it parses the workflow request as shown in block 915. Because the workflow manager 325 detects triggers generated by processes internal to the chronicle platform 105 and external to it from institutes 115 and/or data services 180. the workflow manager 325 parses the triggers from both sources. Once parsed, the workflow manager 325 must compute which of the GUI generator 375, the data aggregator 380, the chronicle processor 385, the backing processor 390, and the version generator 395 processes are needed to resolve the workflow request as shown in block 920. For each of the processes needed to resolve the workflow request, the workflow manager 325 generates a set of instructions as shown in block 925. The workflow manager 325 must then compute a synchronization plan as shown in block 930. For instance, if the workflow request is to capture a version of the resource memorandum, the workflow manager 325 must start the chronicle processor 385 before starting the version generator 395. There are processes that can run simultaneously, for instance the GUI generator 375 can simultaneously process the presentation for reporting receiving a credit report while version generator 395 captures the second version of the resource memorandum. The workflow manager 325 initiates the process according the synchronization plan as shown in block 935. The workflow manager 325 waits for the initiated processes to finish as shown in block 940. Once the initiated process report they are finished, the workflow manager 325 then determines if more processes need to be initiated as shown in block 945. The workflow manager 325 initiates those processes as shown in block 935. This might occur, for instance, if the chronical processor 385 executes instructions that fill the chronicle with all required content objects to trigger a report to institutes 115 an to capture a version of the resource memorandum. Once there are no processes left to initiate, the workflow manager 325 detects new triggers that the processes generated as shown in block 950. If the workflow manager 325 detects triggers it must parse those workflow requests as shown in block 915 and repeat the process 900 until there are no processes to initiate and no triggers detected as shown in block 955.

We fully incorporate by reference herein for all purposes: U.S. Provisional Application No. 61/714,647, filed on Oct. 16, 2012; U.S. Provisional Application No. 61/652,970, filed on May 30, 2012; U.S. Provisional Application No. 61/652,977, filed on May 30, 2012; U.S. Provisional Application No. 61/792,011, filed on Mar. 15, 2013; U.S. Provisional Application No. 62/032,239, filed on Aug. 1, 2014; U.S. Provisional Application No. 62/102,196, filed on Jan. 12, 2015; U.S. Provisional Application No. 62/187,487, filed on Jul. 1, 2015; U.S. patent application Ser. No. 14/713,899 filed on May 15, 2015; U.S. patent application Ser. No. 14/590,714 filed on Jan. 6, 2015; U.S. Pat. No. 9,098,875 issued Aug. 4, 2015; U.S. Pat. No. 9,098,875 issued Aug. 4, 2015; U.S. Pat. No. 9,082,151 issued Jul. 14, 2015; U.S. Pat. No. 8,762,376 issued Jun. 24, 2014; and U.S. Pat. No. 8,572,083 issued Oct. 29, 2013.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

We claim:

1. A processor-based system for automatically finalizing versions of resource memorandums during processing of financial-service requests, the processor-based system comprising:
    one or more data processors; and
    a non-transitory computer readable storage medium containing instructions, which when executed on the one or more data processors, cause the one or more data processors to perform actions including:
    identifying a workflow that corresponds to processing of a financial-service request, wherein:
    the workflow includes a first stage, a second stage and a third stage;
    the first stage includes a verification type of processing that is at least partly controlled by a first type of entity;
    the second stage includes an approval type of processing that is at least partly controlled by a second type of entity;
    the workflow is configured to support bi-directional movement from the second stage, wherein a workflow iteration progresses from the second stage to the third stage when a progression condition is satisfied and from the second stage to the first stage when the progression condition is not satisfied;
    a version of a resource memorandum is automatically finalized prior to progression from at least one stage in the workflow;
    detecting a finalized first version of a resource memorandum, the finalized first version of the resource memorandum corresponding to a first set of data used for processing the financial-service request, the finalized first version of the resource memorandum having been finalized in response to performance of the verification type of processing controlled by a first device associated with a first entity of the first type of entity, the finalization triggering an availing of the first set of data corresponding to at least part of the finalized first version of the resource memorandum at a second agent device associated with a second entity of the second type of entity;
    detecting a first result of the approval type of processing of the first set of data controlled by the second agent device;
    creating a finalized second version of the resource memorandum by storing the second version of the resource memorandum in association with a version identifier in a manner that inhibits modification of the finalized second version of the resource memorandum, the finalized second version of the resource memorandum including the first result;

generating a third version of the resource memorandum that is configured to accept modifications until the third version of the resource memorandum is finalized;

determining whether the progression condition is satisfied based on whether the first result at least partly indicates that:

a first input has been received corresponding to a request to proceed to a next stage of the workflow using the finalized second version of the resource memorandum; or one or more types of data have been provided, a second input corresponding to a type of data of the one or more data types;

when it is determined that the progression condition is satisfied, availing a first at least part of a second set of data at a third agent device associated with a third entity of a third type of entity in accordance with the third stage of the workflow; and when it is determined that the progression condition is not satisfied, availing a second at least part of the second set of data at the first agent device.

2. The processor-based system for automatically finalizing versions of resource memorandums during processing of financial-service requests as recited in claim 1, wherein the first type of entity is a loan officer, and wherein the second type of entity is a loan underwriter.

3. The processor-based system for automatically finalizing versions of resource memorandums during processing of financial-service requests as recited in claim 1, wherein determining whether the progression condition is satisfied includes determining whether an input corresponding to a request to proceed to the third stage of the workflow using the finalized second version of the resource memorandum has been received.

4. The processor-based system for automatically finalizing versions of resource memorandums during processing of financial-service requests as recited in claim 1, further including:

detecting a second result produced in response to processing of the second set of data, the processing having been controlled by the third agent device; and creating a finalized third version of the resource memorandum by storing the third version of the resource memorandum with a second version identifier in a manner that inhibits modification of the finalized third version of the resource memorandum, the finalized third version of the resource memorandum including the second result.

5. The processor-based system for automatically finalizing versions of resource memorandums during processing of financial-service requests as recited in claim 1, wherein:

detecting the first result corresponds to detecting that a deficiency in the finalized second version of the resource memorandum has been identified.

6. The processor-based system for automatically finalizing versions of resource memorandums during processing of financial-service requests as recited in claim 1, wherein determining that the second version of the resource memorandum is finalized includes detecting that an input has been detected at the second agent device.

7. The processor-based system for automatically finalizing versions of resource memorandums during processing of financial-service requests as recited in claim 1, further comprising:

detecting an audit request corresponding to the financial-service request;

retrieving the finalized second version of the resource memorandum from a data store; and facilitating a presentation of the finalized second version of the resource memorandum in response to the audit request.

8. A computer-implemented method for automatically finalizing versions of resource memorandums during processing of financial-service requests, the computer-implemented method comprising:

identifying a workflow that corresponds to processing of a financial-service requests, wherein:

the workflow includes a first stage, a second stage and a third stage;

the first stage includes a verification type of processing that is at least partly controlled by a first type of entity;

the second stage includes an approval type of processing that is at least partly controlled by a second type of entity;

the workflow is configured to support bi-directional movement from the second stage, wherein a workflow iteration progresses from the second stage to the third stage when a progression condition is satisfied and from the second stage to the first stage when the progression condition is not satisfied;

a version of a resource memorandum is automatically finalized prior to progression from at least one stage in the workflow;

detecting, using one or more processors, a finalized first version of a resource memorandum, the finalized first version of the resource memorandum corresponding to a first set of data used for processing the financial-service request, the finalized first version of the resource memorandum having been finalized in response to performance of the verification type of processing controlled by a first device associated with a first entity of the first type of entity, the finalization triggering an availing of the first set of data corresponding to at least part of the finalized first version of the resource memorandum at a second agent device associated with a second entity of the second type of entity;

detecting a first result of the approval type of processing of the first set of data controlled by the second agent device;

creating a finalized second version of the resource memorandum by storing the second version of the resource memorandum in association with a version identifier in a manner that inhibits modification of the finalized second version of the resource memorandum, the finalized second version of the resource memorandum including the first result;

generating a third version of the resource memorandum that is configured to accept modifications until the third version of the resource memorandum is finalized;

determining whether the progression condition is satisfied based on whether the first result at least partly indicates that:

a first input has been received corresponding to a request to proceed to a next stage of the workflow using the finalized second version of the resource memorandum; or one or more types of data have been provided, a second input corresponding to a type of data of the one or more data types;

when it is determined that the progression condition is satisfied, availing a first at least part of a second set of data at a third agent device associated with a third entity of a third type of entity in accordance with the third stage of the workflow; and when it is determined that the progression condition is not satisfied, availing a second at least part of the second set of data at the first agent device.

9. The computer-implemented method for automatically finalizing versions of resource memorandums during processing of financial-service requests as recited in claim 8, wherein the first type of entity is a loan officer, and wherein the second type of entity is a loan underwriter.

10. The computer-implemented method for automatically finalizing versions of resource memorandums during processing of financial-service requests as recited in claim 8, wherein determining whether the progression condition is satisfied includes determining whether an input corresponding to a request to proceed to the third stage of the workflow using the finalized second version of the resource memorandum has been received.

11. The computer-implemented method for automatically finalizing versions of resource memorandums during processing of financial-service requests as recited in claim 8, further comprising:
    detecting a second result produced in response to processing of the second set of data, the processing having been controlled by the third agent device; and
    creating a finalized third version of the resource memorandum by storing the third version of the resource memorandum with a second version identifier in a manner that inhibits modification of the finalized third version of the resource memorandum, the finalized third version of the resource memorandum including the second result.

12. The computer-implemented method for automatically finalizing versions of resource memorandums during processing of financial-service requests as recited in claim 8, wherein detecting the first result corresponds to detecting that a deficiency in the finalized second version of the resource memorandum has been identified.

13. The computer-implemented method for automatically finalizing versions of resource memorandums during processing of financial-service requests as recited in claim 8, wherein determining that the second version of the resource memorandum is finalized includes detecting that an input has been detected at the second agent device.

14. The computer-implemented method for automatically finalizing versions of resource memorandums during processing of financial-service requests as recited in claim 8, further comprising:
    detecting an audit request corresponding to the financial-service request;
    retrieving the finalized second version of the resource memorandum from a data store; and
    facilitating a presentation of the finalized second version of the resource memorandum in response to the audit request.

15. A computer-program product for automatically finalizing versions of resource memorandums during processing of financial-service requests tangibly embodied in a non-transitory machine-readable storage medium, including instructions configured to cause one or more data processors to perform actions including:
    identifying a workflow that corresponds to processing of a financial-service request, wherein:
    the workflow includes a first stage, a second stage and a third stage;
    the first stage includes a verification type of processing that is at least partly controlled by a first type of entity;
    the second stage includes an approval type of processing that is at least partly controlled by a second type of entity;
    the workflow is configured to support bi-directional movement from the second stage, wherein a workflow iteration progresses from the second stage to the third stage when a progression condition is satisfied and from the second stage to the first stage when the progression condition is not satisfied;
    a version of a resource memorandum is automatically finalized prior to progression from at least one stage in the workflow;
    detecting a finalized first version of a resource memorandum, the finalized first version of the resource memorandum corresponding to a first set of data used for processing the financial-service request, the finalized first version of the resource memorandum having been finalized in response to performance of the verification type of processing controlled by a first device associated with a first entity of the first type of entity, the finalization triggering an availing of the first set of data corresponding to at least part of the finalized first version of the resource memorandum at a second agent device associated with a second entity of the second type of entity;
    detecting a first result of the approval type of processing of the first set of data controlled by the second agent device;
    creating a finalized second version of the resource memorandum by storing the second version of the resource memorandum in association with a version identifier in a manner that inhibits modification of the finalized second version of the resource memorandum, the finalized second version of the resource memorandum including the first result;
    generating a third version of the resource memorandum that is configured to accept modifications until the third version of the resource memorandum is finalized;
    determining whether the progression condition is satisfied based on whether the first result at least partly indicates that:
    a first input has been received corresponding to a request to proceed to a next stage of the workflow using the finalized second version of the resource memorandum; or
    one or more types of data have been provided, a second input corresponding to a type of data of the one or more data types;
    when it is determined that the progression condition is satisfied, availing a first at least part of a second set of data at a third agent device associated with a third entity of a third type of entity in accordance with the third stage of the workflow; and
    when it is determined that the progression condition is not satisfied, availing a second at least part of the second set of data at the first agent device.

16. The computer-program product for automatically finalizing versions of resource memorandums during processing of financial-service requests tangibly embodied in a non-transitory machine-readable storage medium, including instructions configured to cause one or more data processors to perform actions as recited in claim 15, wherein the first type of entity is a loan officer, and wherein the second type of entity is a loan underwriter.

17. The computer-program product for automatically finalizing versions of resource memorandums during processing of financial-service requests tangibly embodied in a non-transitory machine-readable storage medium, including instructions configured to cause one or more data processors to perform actions as recited in claim 15, wherein determining whether the progression condition is satisfied includes determining whether an input corresponding to a request to proceed to the third stage of the workflow using the finalized second version of the resource memorandum has been received.

18. The computer-program product for automatically finalizing versions of resource memorandums during processing of financial-service requests tangibly embodied in a non-transitory machine-readable storage medium, including instructions configured to cause one or more data processors to perform actions as recited in claim 15, wherein the actions further include:
  detecting a second result produced in response to processing of the second set of data, the processing having been controlled by the third agent device;
and
  creating a finalized third version of the resource memorandum by storing the third version of the resource memorandum with a second version identifier in a manner that inhibits modification of the finalized third version of the resource memorandum, the finalized third version of the resource memorandum including the second result.

19. The computer-program product for automatically finalizing versions of resource memorandums during processing of financial-service requests tangibly embodied in a non-transitory machine-readable storage medium, including instructions configured to cause one or more data processors to perform actions as recited in claim 15, wherein:
  detecting the first result corresponds to detecting that a deficiency in the finalized second version of the resource memorandum has been identified.

20. The computer-program product for automatically finalizing versions of resource memorandums during processing of financial-service requests tangibly embodied in a non-transitory machine-readable storage medium, including instructions configured to cause one or more data processors to perform actions as recited in claim 15, further comprising:
  detecting an audit request corresponding to the financial-service request;
  retrieving the finalized second version of the resource memorandum from a data store; and
  facilitating a presentation of the finalized second version of the resource memorandum in response to the audit request.

* * * * *